J. H. MOTT.
MANURE SPREADER.
APPLICATION FILED JUNE 27, 1917. RENEWED JUNE 1, 1918.

1,289,513.

Patented Dec. 31, 1918.
2 SHEETS—SHEET 1.

WITNESSES:
B. Hall
G. E. Sorensen

INVENTOR:
JAMES H. MOTT
BY
Paul & Paul
ATTORNEYS

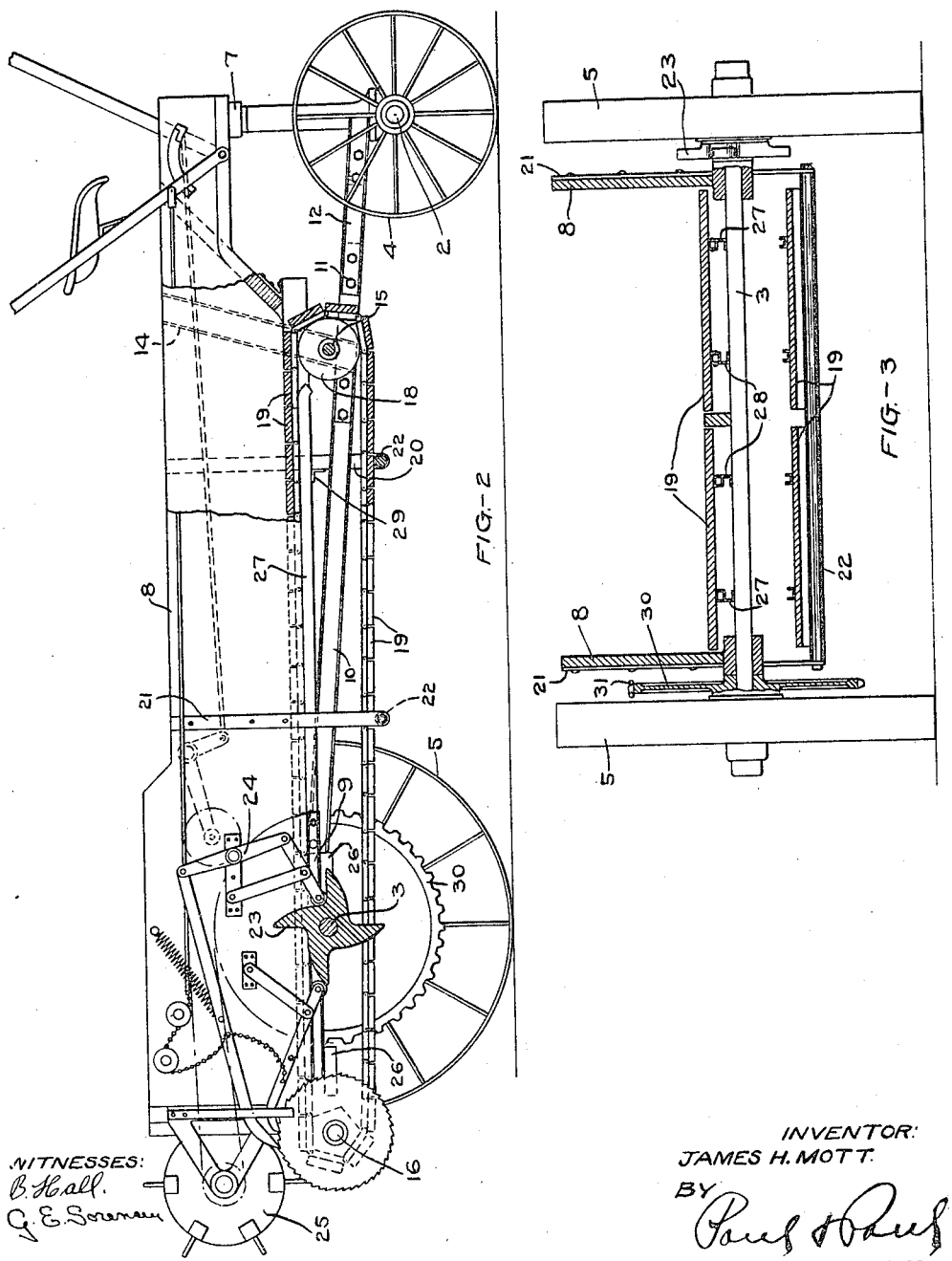

UNITED STATES PATENT OFFICE.

JAMES H. MOTT, OF MINNEAPOLIS, MINNESOTA.

MANURE-SPREADER.

1,289,513. Specification of Letters Patent. Patented Dec. 31, 1918.

Application filed June 27, 1917, Serial No. 177,256. Renewed June 1, 1918. Serial No. 237,820.

*To all whom it may concern:*

Be it known that I, JAMES H. MOTT, a citizen of the United States, resident of Minneapolis, county of Hennepin, State of Minnesota, have invented certain new and useful Improvements in Manure-Spreaders, of which the following is a specification.

The object of my invention is to provide a manure spreader of the low-down type which will be comparatively light in construction and composed of but few parts and hence inexpensive to manufacture and maintain.

A further object is to provide a spreader in which the pull or draft is transmitted directly from the forward to the rear axle.

Other objects of the invention will appear from the following detailed description.

The invention consists generally in various constructions and combinations, all as hereinafter described and particularly pointed out in the claims.

In the accompanying drawings forming part of this specification,

Fig. 2 is a side elevation, partially in section, of the same,

Fig. 3 is a transverse sectional view.

Figure 1:
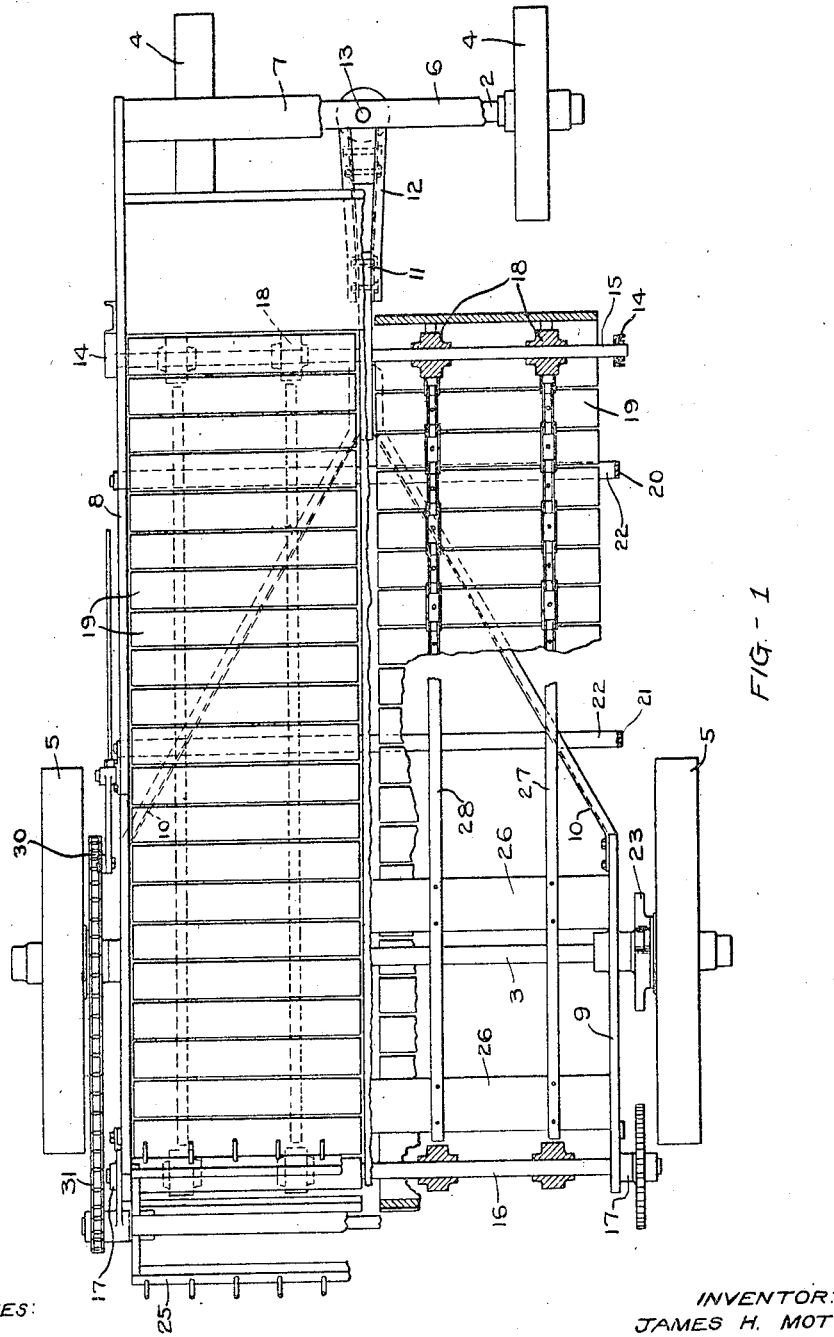
Figure 1 is a plan view of a manure spreader embodying my invention.

In the drawing, 2 and 3 represent the forward and rear axles and 4 and 5 the carrying wheels therefor. 6 is the forward axle bolster and 7 is a cross bar at the forward end of the spreader box 8 which is seated on the bolster. Plates 9, preferably of angle bar material, are mounted on the rear axle and reach bars 10 are secured at their rear ends to the forward ends of these plates and converge therefrom and are secured at 11 to a plate 12 that is mounted on the king-bolt 13 below the bolster. Through these reach bars the draft is transmitted directly to the rear axle. The spreader box has depending bars 14 at its forward end in which the shaft 15 is supported and a similar shaft 16 is mounted in bearings 17 at the rear ends of the plates 9. The shaft 15 is above the forward portion of the reach bars and beneath the spreader box and hubs 18 are mounted on this shaft and on the shaft 16 and support the slatted apron 19, the upper stretch of which forms the bottom of the spreader box while the lower stretch is beneath the reach bars 10 and the rear axle. Bars 20 and 21 are secured to the side walls of the box and depend therefrom and are provided with anti-friction rollers 22 upon which the lower stretch of the apron is mounted to slide. A star wheel 23 is mounted on the hub of one of the rear carrying wheels for operating a ratchet feed mechanism 24 through the shaft 16 to drive the apron and control the feed of the load in the box to the spiked cylinder 25 in the rear of the apron.

I prefer, as shown in Fig. 1, to make the apron in two longitudinal sections, each extending half way across the spreader box and operating simultaneously through the movement of their supporting shafts to feed the load back to the spreading cylinder.

I prefer to provide cross bars 26 between the plates 9 in the front and the rear of the shaft 3 and on these cross bars I mount bars 27 and 28 which extend forwardly between the side walls of the spreader box and near the lower edges thereof and form supports for the upper stretches of the apron sections. The forward portion of these bars is preferably supported by a cross piece 29 which is secured to the depending bars 20 on each side of the spreader box. A large sprocket wheel 30 is mounted on one of the rear carrying wheels and drives the cylinder 25 through the belt 31.

This spreader is composed of comparatively few parts and of very light, though strong and durable construction, hence it will be inexpensive to manufacture and can be easily operated.

I claim as my invention:

1. A manure spreader comprising forward and rear axles and carrying wheels therefor, a spreader box, a bolster supporting said box on the forward axle, plates having bearings on said rear axle on each side of said box, reach bars having a pivotal connection at their forward ends with said forward axle and diverging at their rear ends and secured to said plates, cross bars between said plates, guide bars secured to said cross bars and projecting forwardly of said rear axle above said reach bars, and a feed apron divided longitudinally into independent sections, each having its upper stretch above said guide bars and its lower stretch below said reach bars and guiding means for the lower stretches of said aprons.

2. A manure spreader comprising forward and rear axles and carrying wheels therefor, a spreader box, reach bars having a pivotal connection at their forward ends with said forward axle and having diverging rear ends connected to said rear axle, bars supported above said rear axle and extending forwardly therefrom, apron belts having their upper stretches resting upon said bars and guided thereby and forming the bottom of said spreader box, the lower stretches of said apron operating below said rear axle and said reaches, and means carried by said spreader box for guiding said lower stretches.

3. A manure spreader comprising forward and rear axles and carrying wheels, a spreader box having side walls and an open bottom, bars depending from the forward portion of said box, a shaft mounted in said bars, a feed apron divided longitudinally into independent sections having their forward portions supported by said shaft, the upper stretches of said apron sections forming the bottom of said spreader box, plates having bearings on said rear axle, reaches having a pivotal connection at their forward ends with said forward axle and secured at their rear ends to said plates, a shaft having bearings in the rear portions of said plates and on which the rear portions of said apron sections are supported, the lower stretches of said apron sections operating beneath said rear axle and plates and said reaches.

4. A manure spreader comprising forward and rear axles and carrying wheels, a spreader box, reaches connecting said forward axle with said rear axle, an apron divided longitudinally into independent sections, the upper stretches of said apron forming the bottom of said spreader box, the lower stretches thereof operating beneath said rear axle and said reaches, and bars carried by said box and depending below said reaches and having anti-friction rollers whereon the lower stretches of said sections are supported and guided.

5. A manure spreader comprising forward and rear axles and carrying wheels therefor, a spreader box, reach bars having a pivotal connection at their forward ends with said forward axle and diverging at their rear ends and connected to said rear axle, guide bars projecting forwardly of said rear axle above said reach bars, a feed apron divided longitudinally into independent sections, the upper stretches of said apron forming the bottom of said spreader box and the lower stretches of said apron operating beneath said reach bars and said rear axle.

6. A manure spreader comprising forward and rear axles and carrying wheels therefor, a spreader box, plates having bearings on said rear axle on each side of said box and projecting forwardly and rearwardly thereof, reach bars pivotally connected at their forward ends to said forward axle and secured at their rear ends to said plates, a shaft supported by the forward portion of said box adjacent said reach bars, a second shaft having bearings in the rearwardly extending portion of said plates, a feed apron divided longitudinally into independent sections having bearings on said shafts, the upper stretches of said apron sections forming the bottom of said box above said reaches and the lower stretches of said apron sections being below said reaches and said rear axle.

7. A manure spreader comprising forward and rear axles and carrying wheels, a spreader box, reaches connecting said forward axle with said rear axle, an apron divided longitudinally into independent sections, the upper stretches of said apron forming the bottom of said spreader box, the lower stretches thereof operating beneath said rear axle and said reaches.

8. A manure spreader comprising forward and rear axles and carrying wheels, a spreader box, reach bars having a pivotal connection at their forward ends with said forward axle and having diverging rear ends connected to said rear axle, bars arranged above said rera axle and extending forwardly therefrom, apron belts having their upper stretches guided by said bars and forming the bottom of said spreader box, the lower stretches of said apron operating beneath said rear axle and said reach bars.

9. A manure spreader comprising forward and rear axles and carrying wheels therefor, a spreader box, reach bars having a pivotal connection at their forward ends with said forward axle and connected to said rear axle, guide bars projecting forwardly of said rear axle above said reach bars, a feed apron, the upper stretch of said apron forming the bottom of said spreader box and guided by said bars, and the lower stretch of said apron operating beneath said reach bars and said rear axle.

10. A manure spreader comprising forward and rear axles and carrying wheels, a spreader box, and an apron divided longitudinally into independent sections and forming the bottom of said box.

11. A manure spreader comprising forward and rear axles and carrying wheels, a spreader box, and an apron divided longitudinally into independent sections and forming the bottom of said box, the lower stretches of said apron sections operating beneath said rear axle.

12. A manure spreader comprising forward and rear axles and carrying wheels, a spreader box, reach bars between said axles, bars arranged above said rear axle and extending forwardly therefrom, an apron belt guided by said bars and forming the bottom of said spreader box, the lower run of said apron operating beneath said rear axle and said reach bars.

13. A manure spreader comprising forward and rear axles and carrying wheels, a spreader box, plates having bearings on said rear axle, reach bars pivotally connected at their forward ends to said forward axle and secured at their rear ends to said plates, a shaft supported by the forward portion of said box adjacent said reach bars, a second shaft having bearings in said plates, a feed apron having its upper stretch forming the bottom of the box above said reaches and its lower stretch being below said reaches and said rear axle.

14. A manure spreader comprising forward and rear axles and carrying wheels, a spreader box, reach bars having a pivotal connection at their forward ends with said forward axle and having diverging rear ends connected to said rear axle, bars arranged above said rear axle and extending forwardly therefrom and an apron having its upper stretch guided by said bars and forming the bottom of the spreader box, the lower stretch of said apron operating beneath said rear axle and said reach bars.

In witness whereof, I have hereunto set my hand this 19" day of June, 1917.

JAMES H. MOTT.